United States Patent
Sensenig et al.

(10) Patent No.: US 7,746,228 B2
(45) Date of Patent: Jun. 29, 2010

(54) PASSIVE CONTAINER TRACKING DEVICE, SYSTEM, AND METHOD

(76) Inventors: Tim R. Sensenig, 1420 Whittington Dr., Raleigh, NC (US) 27614; Bary Bertiger, 231 SE. Bella Strano, Port St. Lucie, FL (US) 34984; Bernard Asher, 1308 Lake Shore Dr. North, Barrington, IL (US) 60010

( * ) Notice: Subject to any disclaimer, the term of this patent is extended or adjusted under 35 U.S.C. 154(b) by 535 days.

(21) Appl. No.: 11/452,068

(22) Filed: Jun. 12, 2006

(65) Prior Publication Data

US 2007/0285240 A1    Dec. 13, 2007

(51) Int. Cl.
G08B 13/14    (2006.01)

(52) U.S. Cl. .............................. 340/572.1; 340/539.13; 700/215; 700/222; 705/22

(58) Field of Classification Search ... 340/572.1–572.9, 340/5.64, 5.92, 10.1, 825.49, 539.1, 531; 235/375, 385, 492; 700/215, 221–222, 224–227, 700/229; 705/22, 28
See application file for complete search history.

(56) References Cited

U.S. PATENT DOCUMENTS

| | | | |
|---|---|---|---|
| 5,347,280 A | 9/1994 | Schuermann | |
| 5,588,005 A * | 12/1996 | Ali et al. .................... | 370/346 |
| 5,774,876 A * | 6/1998 | Woolley et al. .............. | 705/28 |
| 5,833,603 A | 11/1998 | Kovacs et al. | |
| 5,920,287 A | 7/1999 | Belcher et al. | |
| 6,130,602 A | 10/2000 | O'Toole et al. | |
| 6,211,789 B1 | 4/2001 | Oldham et al. | |
| 6,246,882 B1 | 6/2001 | Lachance | |
| 6,339,397 B1 | 1/2002 | Baker | |
| 6,367,888 B1 | 4/2002 | Kee et al. | |
| 6,450,411 B1 | 9/2002 | Rash et al. | |
| 6,509,828 B2 | 1/2003 | Bolavage et al. | |
| 6,735,630 B1 | 5/2004 | Gelvin et al. | |
| 6,779,721 B2 | 8/2004 | Larson et al. | |
| 6,801,763 B2 * | 10/2004 | Elsey et al. .............. | 455/404.1 |
| 6,826,607 B1 | 11/2004 | Gelvin et al. | |
| 6,832,251 B1 | 12/2004 | Gelvin et al. | |
| 6,837,436 B2 | 1/2005 | Swartz et al. | |
| 6,847,892 B2 | 1/2005 | Zhou et al. | |
| 6,901,304 B2 | 5/2005 | Swan et al. | |
| 6,919,803 B2 | 7/2005 | Breed | |
| 6,922,173 B2 | 7/2005 | Anderson | |
| 6,943,678 B2 | 9/2005 | Muirhead | |
| 6,965,816 B2 | 11/2005 | Walker | |
| 6,972,682 B2 | 12/2005 | Lareau et al. | |
| 6,977,612 B1 | 12/2005 | Bennett | |
| 6,988,079 B1 | 1/2006 | Or-Bach et al. | |

(Continued)

*Primary Examiner*—George A Bugg

(57) ABSTRACT

A passive identification system for shipping containers. The shipping containers contain passive identification devices that are interrogated by separate on-board location trackers (OBLT) located in places where shipping containers are expected to pass in proximity to during the shipping and transport process. The OBLTs contain an active transmitter and GPS device. After the OBLT interrogates the passive identification device on a shipping container, the OBLT generates a geo-word comprised of the container identification, the GPS location of the OBLT, and a time stamp, and transmits the geo-word to a receiving station for tracking and/or security purposes. The receiving station has manifest information regarding the shipping containers stored in memory. In this manner, the receiving station can compare the geo-word to the expected shipping locations and expected times for the shipping container to determine if the shipping container is lost, misplaced, or off-schedule.

46 Claims, 8 Drawing Sheets

U.S. PATENT DOCUMENTS

| | | |
|---|---|---|
| 6,995,673 B1 | 2/2006 | Osredkar et al. |
| 7,012,520 B2 | 3/2006 | Webb, Sr. |
| 7,012,529 B2 | 3/2006 | Sajkowsky |
| 7,243,845 B2 * | 7/2007 | Cash et al. ................. 235/384 |
| 2002/0134836 A1 | 9/2002 | Cash et al. |
| 2005/0039014 A1 * | 2/2005 | Sajkowsky ................. 713/172 |
| 2005/0075892 A1 * | 4/2005 | Watkins et al. ................. 705/1 |
| 2006/0046740 A1 * | 3/2006 | Johnson ................... 455/456.1 |
| 2006/0097046 A1 * | 5/2006 | Baru Fassio et al. ........ 235/385 |
| 2006/0145881 A1 * | 7/2006 | Sakatani et al. ............. 340/679 |
| 2006/0164259 A1 * | 7/2006 | Winkler et al. .............. 340/944 |
| 2007/0096899 A1 * | 5/2007 | Johnson ................. 340/539.13 |

* cited by examiner

PASSIVE CONTAINER TRACKING DEVICE, SYSTEM, AND METHOD

FIELD OF THE INVENTION

The present invention relates to a passive tracking device for tracking the location of shipping containers to determine whether the shipping containers are lost and/or located out of bounds of expected geographic locations.

BACKGROUND OF THE INVENTION

Shipping containers are used throughout the world to ship goods as part of a global supply chain. Many shipping companies attach transmitting devices to shipping containers to either track their geographic location or for security purposes. This allows the shipping company to determine the geographic location of the container as it moves between the origination and intermediate or final destination points to determine whether the goods inside the shipping container are on time, late, or misplaced. For instance, the shipping container may have been misrouted shipping container or been placed on the incorrect transport ship to reach its intended destination. A misrouted may be indicative of a security breach that requires special attention. Further, communicating a misrouted shipping container condition to a shipping company and/or intended recipient of the shipment may better allow for planning purposes, especially in manufacturing. The advantages of tracking the position of shipped goods are many and therefore have become commonplace throughout the shipping industry.

Many shipping containers employ the use of a global positioning system (GPS) and a transmitter to communicate the whereabouts of the shipping container. The GPS associated with the shipping container receives signals from GPS satellites that allows the GPS to ascertain its coordinates. An identification indicia of the shipping container along with its calculated coordinates are then transmitted by the on-board transmitter to a remote receiver station or location where the identification indicia and coordinates are received. The identification indicia may be stored in memory located on-board the shipping container, or in an active radio-frequency identification device (RFID). A transmitter may store the identification indicia regarding the container in the RFID during manufacture or when shipping is initiated. The remote receiver station may employ algorithms to log the received data from the shipping container and communicate the data to another system or operator.

A common problem in each of these tracking systems is that the shipping container employs an active transmitting device that substantially increases the cost of the shipping container. Without an active transmitting device, the remote receiver station would not receive communications from the shipping container and thus not know if the shipping container reaches its intended destination points, is misrouted or is lost. Further, the active transmitting device requires its own power source that must be monitored and replaced as necessary. A shipping container will not transmit its identification indicia and location information if the power source is drained, thus causing the shipping container to in essence be lost in the supply chain. Also, the GPS satellite signals that communicate may not always be able to reach the shipping container, and thus the location information may not always be ascertainable. For instance, the shipping container may be contained inside a cargo hold, such as on a ship or inside a transport truck. The GPS satellite signals will be blocked from reaching the shipping container's GPS.

SUMMARY OF THE INVENTION

The present invention solves the problems associated with use of an active transmitting device on a shipping container for tracking and security purposes. The present invention employs a passive identification system for a shipping container. One example is a passive or semi-passive RFID attached to the shipping container that contains unique identification indicia. The shipping container does not contain a GPS or an active transmitting device that requires power and which may not always be able to receive location information about the shipping container and transmit this information to a receiving station. Instead, separate on-board location trackers (OBLT) containing an active transmitter and GPS device are provided separately from the shipping containers. The OBLT are located in places where the shipping container will come into contact during the shipping process. As the shipping container passes in proximity to an OBLT, the OBLT interrogates the RFID on the shipping container to receive its identification indicia. Thereafter, the OBLT generates a container tracking message in the form of a geo-word comprised of the container identification, the GPS location of the OBLT, and/or a time stamp, and transmits the geo-word to the receiving station for tracking and/or security purposes. The shipping container's shipping manifest is entered into a database or memory accessible by the receiving station before the shipping container is shipped so that the receiving station has knowledge of the shipping container's expected destination points and times when the shipping container is expected at such points.

The receiving station uses the geo-word for several distinct purposes. First, the geo-word indicates the current location of the shipping container and the time that the shipping container was located at such location. This allows the receiving station to perform a geo-fence filtering process. The geo-fence filter determines if the shipping container was interrogated at a location that is within its stored shipping route or manifest. Second, the geo-word indicates if the shipping container is on-time, or behind or ahead of schedule versus its expected shipping receipt times from the pre-stored manifest. In this manner, the shipping company or intended recipient of the shipping container can be automatically made aware of an off-schedule shipping container so that remedial actions may be attempted to be taken to put the shipping container back on shipping schedule, or for planning purposes. Other alarms or alerts may be automatically generated.

Another feature made possible by the present invention is the automatic initiation of shipping container tracking when the geo-word is not received on time or within a defined window of time. If the receiving station does not receive a transmission or geo-word regarding a shipping container within an expected time, the receiving station can flag the shipping container as lost and initiate a tracking process. The receiving station can flag a shipping container where no transmission or geo-word is received within an expected time with a high degree of certainty as truly lost because of the passive identification system employed. Otherwise, the shipping container may not be really lost, but rather suffering from either a damaged or un-powered GPS or transmitter on the shipping container, or an obstructed communication channel or path that commonly results when shipping containers are stored in cargo holds during transport.

Because the OBLTs rather than the shipping containers contain the GPS and transmitter, this allows a passive device on the shipping container. Less OBLTs are required to be placed along the shipping points than shipping containers shipped, thereby greatly reducing the cost of the system. For example, RFIDs cost on the order of $1.00 per container or less, whereas complex GPS and transmitting devices can cost one to three times more than passive RFIDs. Passive identification also requires less space, thereby maximizing shipping container capacity. Passive identification devices are also less susceptible to damage and require less frequent and also less costly repair/replacement.

OBLTs may be located on ships, trucks, or in any locations where the shipping containers are expected to come into close proximity of when the container is either loaded, transported, or unloaded between its origination and destination points. The OBLTs can be located in places where receipt of GPS satellite signals and the ability to transmit to a receiving station are always or almost always impossible. The OBLT can include visual indicators of their operational status so that personnel can constantly ensure that the OBLT is in correct working order. It is impractical for personnel to inspect the GPS and active transmitting devices on all shipping containers as opposed to a less in number OBLTs. The OBLT may provide the GPS and transmitter in a single package, or these devices may be provided as separate devices are communicatively coupled to the OBLT's control system. Further, the OBLT may be removable from its support or stand and be used as a handheld device to interrogate shipping containers.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

The invention will be described in conjunction with the following drawings in which like reference numerals designate like elements and wherein.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In summary, the present invention is a passive identification system for shipping containers. The shipping container does not contain a GPS or an active transmitting device that requires power and which may not always be able to receive location information about the container and transmit this information to a receiving station. Instead, separate on-board location trackers (OBLT) containing an active transmitter and GPS devices are provided separately from the shipping containers. The OBLTs are located in places where the shipping container will come into contact during the shipping process. As the shipping container passes in proximity to an OBLT, the OBLT interrogates the RFID on the shipping container to receive its identification information or indicia. Thereafter, the OBLT generates a container tracking message referred to herein as a geo-word comprised of the container identification indicia, the GPS location of the OBLT, and/or a time stamp, and transmits the geo-word to the receiving station for geographic and time-based tracking. The shipping container's shipping manifest is entered into a database or memory accessible by the receiving station before the shipping container is shipped so that the receiving station has knowledge of the shipping container's expected destination points and times when the shipping container is expected at such points. Also, if the receiving station does not receive a container tracking message or geo-word from a shipping container within an expected time, the receiving station automatically activates a tracking process to alert other system or personnel of the missing container.

Overall Tracking System

Figure 1:
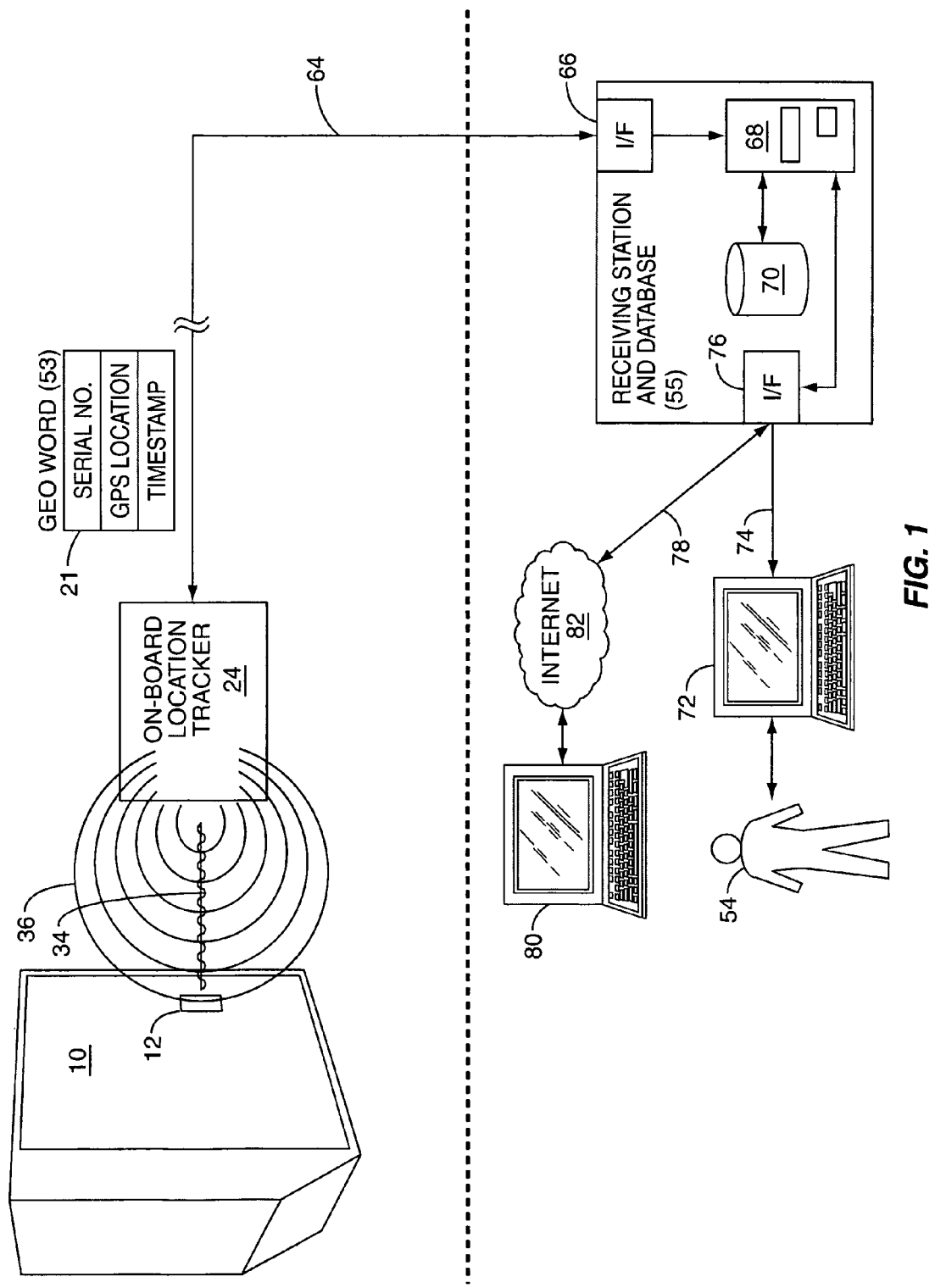
FIG. 1 is a block diagram illustration of the container tracking system according to the present invention for interrogating the passive devices on the shipping container using an OBLT, and generating and communicating a geo-word for the shipping container to a remote receiving station.
Figure 2:
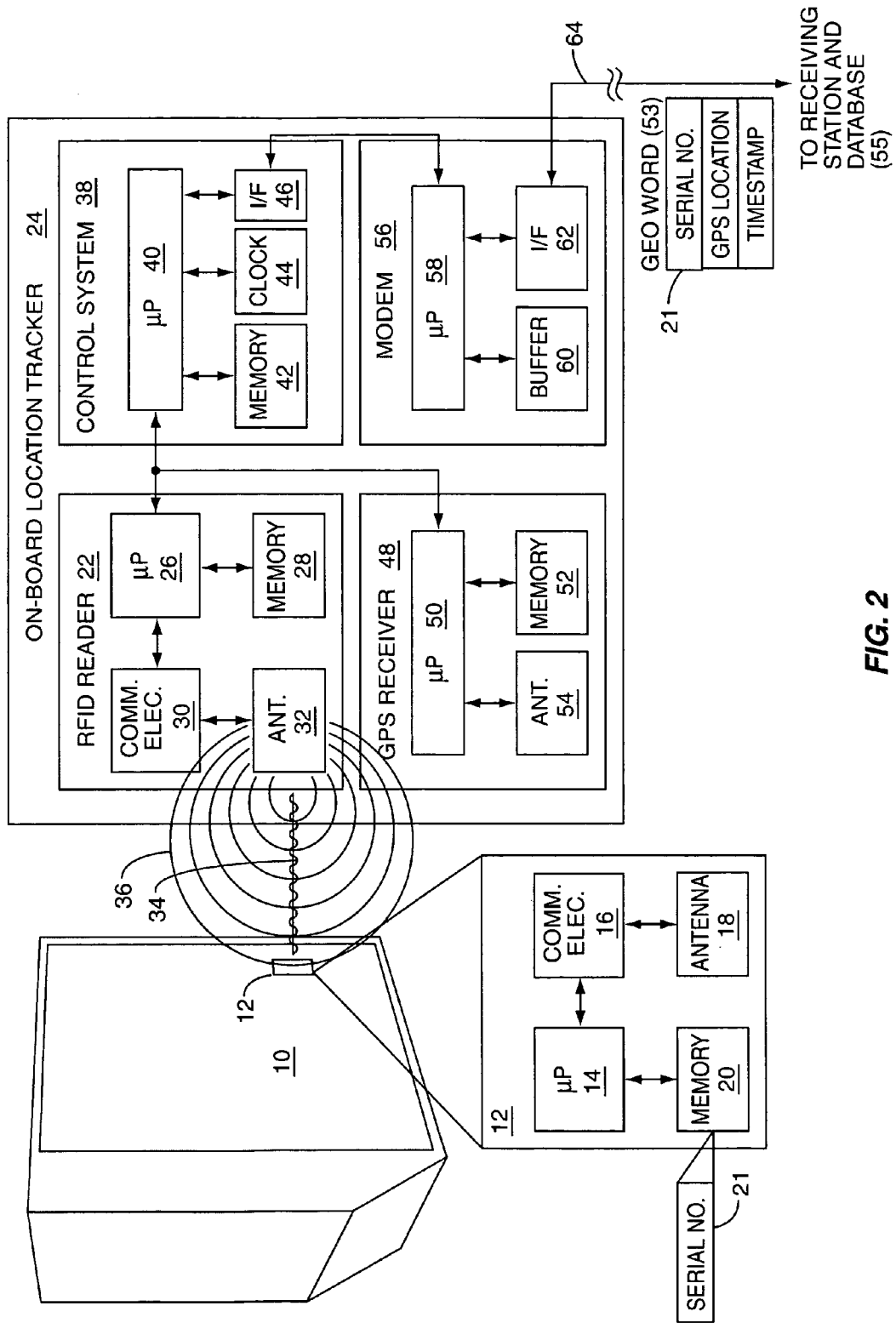
FIG. 2 is an illustration of the internal components of the passive identification device on the shipping container and OBLT to illustrate how the passive identification device is interrogated and how the OBLT forms and communicates the geo-word to the receiving station.

FIG. 1 illustrates a diagram of the overall components used in the tracking system of the present invention in accordance with the exemplary embodiment. FIG. 2 illustrates the internal elements of certain components illustrated in FIG. 1. The description of the components of the present invention and how they communicate with one another to tracking a shipping container is described with respect to both FIGS. 1 and 2.

As illustrated in FIG. 1, a shipping container 10 is provided. The shipping container 10 may be any type of container or holder that is designed to ship goods. The shipping container 10 may take a variety of forms depending upon the type of materials and goods being shipped. The shipping container 10 may also be constructed to provide for temperature sensitive materials and range from insulated packaging, refrigeration units using dry ice, and thermostat equipped containers.

The shipping container 10 contains a passive identification device 12, which may be either a passive or semi-passive RFID or a transponder for example, for electronic communication of identification indicia about the shipping container 10. The passive identification device 12 is interrogated by an interrogation reader using a RF signal in order to obtain identification indicia stored inside the passive identification device 12 regarding the shipping container 10 for tracking purposes. In this manner, the GPS and active transmitter to transmit identification indicia about the shipping container 10 are not provided on the passive identification device 12, thereby reduces costs and complexity, as well as providing a more reliable tracking system as will be described herein. Before discussing more about the components employed by the present invention, a brief explanation of the differences between active and passive identification devices is provided below.

Some identification devices are termed "active" devices (active RFIDs) in that they receive and transmit data using their own energy source. As will be described below, the present invention does not use active identification devices. An active identification device may include its own battery for power as described in U.S. Pat. No. 6,130,602 entitled "Radio frequency data communications device," or may use other forms of energy, such as a capacitor as described in U.S. Pat. No. 5,833,603, entitled "Implantable biosensing transponder." Both of the preceding patents are incorporated herein by reference in their entirety. Typically, active RFIDs are able to achieve longer-range communication, because they are not reliant on power from the RF signal communicated by an interrogation reader. Thus, each active RFID may be able to communicate its presence without having to pass through a detection field of an interrogation reader in order to be activated and detected. In this manner, if the identification devices are active RFIDs, they are designed to actively transmit to and communicate regardless of whether the devices are within an interrogation reader's reading field, thereby reducing the power requirement of the interrogation reader. On the other hand, active RFIDs are more expensive and tend to be larger in size. The increased cost of active RFIDs stems from the fact that they are geared toward more complex implementations that usually require an on-board processor and increased memory sizes to actively track and record data, therein lending themselves to be more data intensive.

Other identification devices are termed "passive" devices (passive RFIDs) meaning that they do not actively transmit and therefore may not include their own energy source for power. One type of passive identification device that may be used with the present invention is known as a "transponder." A transponder effectively transmits information by reflecting back a received signal from an external communication device, such as an interrogation reader, also called "backscatter" communication. An example of a transponder is disclosed in U.S. Pat. No. 5,347,280, entitled "Frequency diversity transponder arrangement," incorporated herein by reference in its entirety. Although passive RFIDs are typically cheaper than their counterpart active RFIDs described above, they have shorter read distances. Although implementing certain passive RFID technologies may allow read distances to become less orientation specific, truly passive RFIDs are typically beneficial when factors such as complexity and read distance are not as important as overall implementation costs.

Yet still another type of identification device is known as a "semi-passive" device (semi-passive RFID) meaning that the antenna in the identification device is used for two-way communication, and an energy source is provided for transmissions as well as using energy received from the magnetic field of the interrogation reader. An interrogation reader is still required like that of the truly passive RFID discussed above. Like the passive RFIDs, the communication is principally backscatter type communication. However, by incorporating an energy source, such as a battery, the read distance of semi-passive RFID is increased as compared to the above discussed passive RFID, thereby improving the overall performance, hence detection, of the identification device attached to the shipping container 10. This increased read distance will also provide greater flexibility in the design of shipping container 10, because the read distance will not be as significant of a factor. Although the addition of the battery in a semi-passive RFID adds some cost as compared to truly passive RFIDs, the semi-passive RFIDs are still typically less expensive than active RFIDs. Therefore, the use of a semi-passive RFID may be used as an alternative to the truly passive RFID described above when there is a greater need for the combination of overall reliability and implementation costs.

While the present invention employs a passive identification device 12 as opposed to an active identification device, the present invention is not limited to any particular type of passive identification device. Operating frequencies of the passive identification device 12 is not limited to any particular frequency, but UHF frequencies (300 MHz to 2400 MHz) may be best suited since these frequency ranges include frequencies that are permitted for use in private, non-government communication systems. Thus, a variety of frequency bands and wireless communication standards may also be implemented in order to meet the scope of the present invention.

Turning back to FIGS. 1 and 2, the internal components of the passive identification device 12 attached to the shipping container 10 are illustrated in FIG. 2. The passive identification device 12 typically contains a microprocessor or microcontroller 14 that controls the operation and communication of the passive identification device 12. The passive identification device 12 contains communication electronics 16 interfaced to the microprocessor 14 that receives incoming interrogation signals via an antenna 18 and retrieves the data from the incoming signal for interpretation by the microprocessor 14. The particular type and location of the antenna 18 will depend on the operating frequency of the passive identification device 12. The antenna 18 receives an interrogation signal and passes the received signal to the communication electronics 16. The communication electronics 16 contains circuitry necessary to interpret the interrogation signal and to further communicate the interpreted signal to the microprocessor 14.

Depending on the complexity of the passive identification device 12 and its microprocessor 14, the passive identification device 12 may be responsive to only a single basic command to provide its identification indicia, or additional commands, such as storage of information including manifest information about the goods contained inside the shipping container 10. In this manner, an interrogation reader may also be able to interrogate information other than identification indicia from the shipping container 10 as part of the tracking system if desired. In the example illustrated in FIG. 2, memory 20 is provided to store an identification indicia 21 about the shipping container 10. The identification indicia 21 may be a serial number of the shipping container 10 for example. Alternatively, the passive identification device 12 may store the identification indicia 21 or other information by using diodes, dip-switches or some other like circuitry in lieu of erasable memory 20. It is important that the identification indicia 21 be unique within the tracking system so that shipping containers 10 and their respective tracking information are not confused and thus provide false tracking results.

Further as illustrated in FIGS. 1 and 2, the present invention employs a RFID reader 22 or interrogation reader 22 as part of an on-board location tracker (OBLT) 24 that serves as the interrogation reader 22 to interrogate the identification indicia 21 from the passive identification device 12 when the shipping container 12 passes in close proximity to the OBLT 24 during shipment and transport between destination points. The OBLT 24 is preferably located in various points in the shipping path of the shipping container 10. For example, if the shipping container 10 is shipped via a ship, the OBLT 24 may be located at entry points where the shipping containers 10 are loaded and unloaded to and from the vessel. OBLTs 24 may also be located inside the cargo storage area where the shipping containers 10 are stored during shipment. If the shipping containers 10 are shipped via rail, truck or aircraft, the OBLTs 24 may be placed at the entry and exits points of these shipping vessels as well. In summary, the OBLTs 24 may be placed anywhere along the shipping path of the shipping containers 10 and in any number desired. The more OBLTs 24 that are provided, the more often the shipping containers 10 are interrogated to provide their identification indicia 21 to the OBLT 24. This is also referred to a "resolution."

The RFID reader 22 contains a microprocessor 26 or microcontroller 26 that controls the operations of the RFID reader 22. Memory 28 is provided to allow the microprocessor 26 to store program store and data store for operations. The microprocessor 26 is interfaced to communication electronics 30 that receive commands and data from the microprocessor 26 destined for the passive identification device 12 and modulate the commands and data to communicate this information using RF signals communicated through an antenna 32. The result is an interrogation signal 34 that is communicated via antenna 32 through an electro and/or magnetic field 36.

Communications between the RFID reader 22 and the passive identification device 12 to interrogate and receive the identification indicia 21 about the shipping container 10 are now described with respect to FIG. 2. When the passive identification device's antenna 18 is in the presence of the field 36 emitted by RFID reader 22, the communication electronics 16 are energized by the received signal 34, thereby energizing the passive identification device 12. The passive identification device 12 remains energized so long as its antenna 18 is in the field 36 of the RFID reader 22. The communication electronics 16 demodulates the received interrogation signal 34 from the RFID reader 22 and sends the message containing information or request to the microprocessor 14 for appropriate action. In the example of the present invention, the request is for the identification indicia 21 of the shipping container 10 stored in the memory 20 of the passive identification device 12 for tracking purposes. The identification indicia 21 is communicated back to the RFID reader 22, via its antenna 32, by backscatter communications. In this manner, the passive identification device 12 does not need to employ a transmitter to communicate this information back to the RFID reader 22. The request may also be for other information stored in the memory 20 of the passive identification device 12, such as the material or goods contained in the shipping container 10, their date of manufacture, place of manufacture, "born-on" date, lot number, etc.

After the RFID reader 22 receives the identification indicia 21 and/or any other information about the shipping container 10 from the passive identification device 12, the RFID reader 22 communicates this information to a control system 38 within the OBLT 24. The control system 38 is communicatively coupled to the RFID reader 22. In this manner, the RFID reader 22 passes the identification indicia 21 interrogated from the passive identification device 12 on the shipping container 10 to the control system 38 for processing. The control system 38 contains a microprocessor 40 or microcontroller 40 that is interfaced to the RFID reader 22 to receive the interrogated information. The microprocessor 40 interfaces with memory 42 to store information, including the identification indicia 21 received from the RFID reader 22, a clock 44 to provide timing and time stamp information when needed, and interface electronics 46 to communicate information, including the identification indicia 21 to other systems as will be described herein.

As illustrated in FIG. 2, the OBLT 24 also employs a GPS receiver 48 that can determine the location of the OBLT 24 at any given time desired. The GPS receiver 48 employs a microprocessor 50 or microcontroller 50 to control the operation of the GPS receiver 48 as well as memory 52 for program and data store, and one or more antennas 54 to receive satellite tracking signals for location determination. In this manner, when the control system 38 receives the identification indicia 21 identifying the shipping container 10, the control system 38 can also determine its GPS location via communications with the GPS receiver 48 so that the control system 38 can formulate a container tracking message, or also called a "geo-word" 53, about the shipping container 10. The geo-word 53 is used for tracking the shipping container 10, as will be described throughout in this application. The geo-word 53 is comprised of at least the identification indicia 21 about the shipping container 10 interrogated and the geographic location of the shipping container 10 when interrogated. Because the shipping container 10 must be in proximity to the OBLT 24 and its RFID reader 22 when interrogated, the GPS receiver 48 determining the location of the OBLT 24 also provides the location of the shipping container 10 interrogated. The geo-word 53 may also contain a time stamp of the time when the control system 38 received the identification indicia 21 of the shipping container 10 to provide the time when the shipping container 10 was interrogated, or a GPS location of the container 10/OBLT 24 when interrogated.

Once the control system 38 creates the geo-word 53 for the shipping container 10 interrogated, the control system 38 is adapted to communicate the geo-word 53 to a receiving station 55 for processing, tracking and other related operations performed by the present invention as will be described later below. The receiving station 55 is typically located remotely from the OBLT 24. Thus, the OBLT 24 contains a remote communication device that allows the OBLT 24 and its control system 38 to communicate the geo-word 53 remotely to the receiving station 55. Either a wired or wireless modem 56 is employed in the OBLT 24 to carry out this purpose. The modem 56 may be a cellular, satellite, or WIFI modem for example. The modem 56 contains a microprocessor 58 or microcontroller 58 that interfaces with the interface electronics 46 to receive the geo-word 53 for transmission to the receiving station 55. By providing the modem 56 as part of the OBLT 24, the passive identification device 12 does not have to contain an active transmitter, and thus avoids this complexity and cost as previously discussed above. The modem 56 contains a buffer 60 for storing data to be transmitted and an interface 62 to actually transmit information, including the geo-word 53, over a communication channel 64 to the receiving station as illustrated in FIGS. 1 and 2. The modem 56 may only allow one-way communication from the OBLT 24 to the receiving station 55 or may be a two-way communication device that can also receive communications from the receiving station 55 for reasons to be discussed alter below.

As illustrated in FIG. 1, the receiving station 55 contains an interface 66 that is communicatively coupled to communication channel 64 to communicate with the OBLT 24 and receive the geo-word 53. After the geo-word 53 is received, the interface 66 communicates the geo-word 53 to a central control system 68 that processes the geo-word 53 as part of the shipping container 10 tracking system as well as other related tracking operations described later below. The receiving station 55 may contain a large database 70 that is interfaced to the central control system 68 for storage of the geo-word 53 and other shipping container 10 tracking related information. The database 70 may be located on-site or remotely from the central control system 68. The central control system 68 may also be accessible via an on-site located man-operated terminal 72 or computer system 72 via a communication link 74 to an interface 76 coupled to the central control system 68, or via remote communications over a remote communication link 78 to a remotely located terminal 80 or computer 80. The remote communications link 78 may include the Internet 82 and include TCP/IP based communications using HTTP or other related protocol. Providing computer terminal interfaces allows operators, shipping companies, and/or shipping customers to login to the central computer system 68 to find out information about shipped containers 10, including geo-word 53 and other tracking information, and to receive alerts or receiving station 55 initiated communications about the shipping containers 10 as well, as will be described below in the operational description of the present invention.

Figure 3:
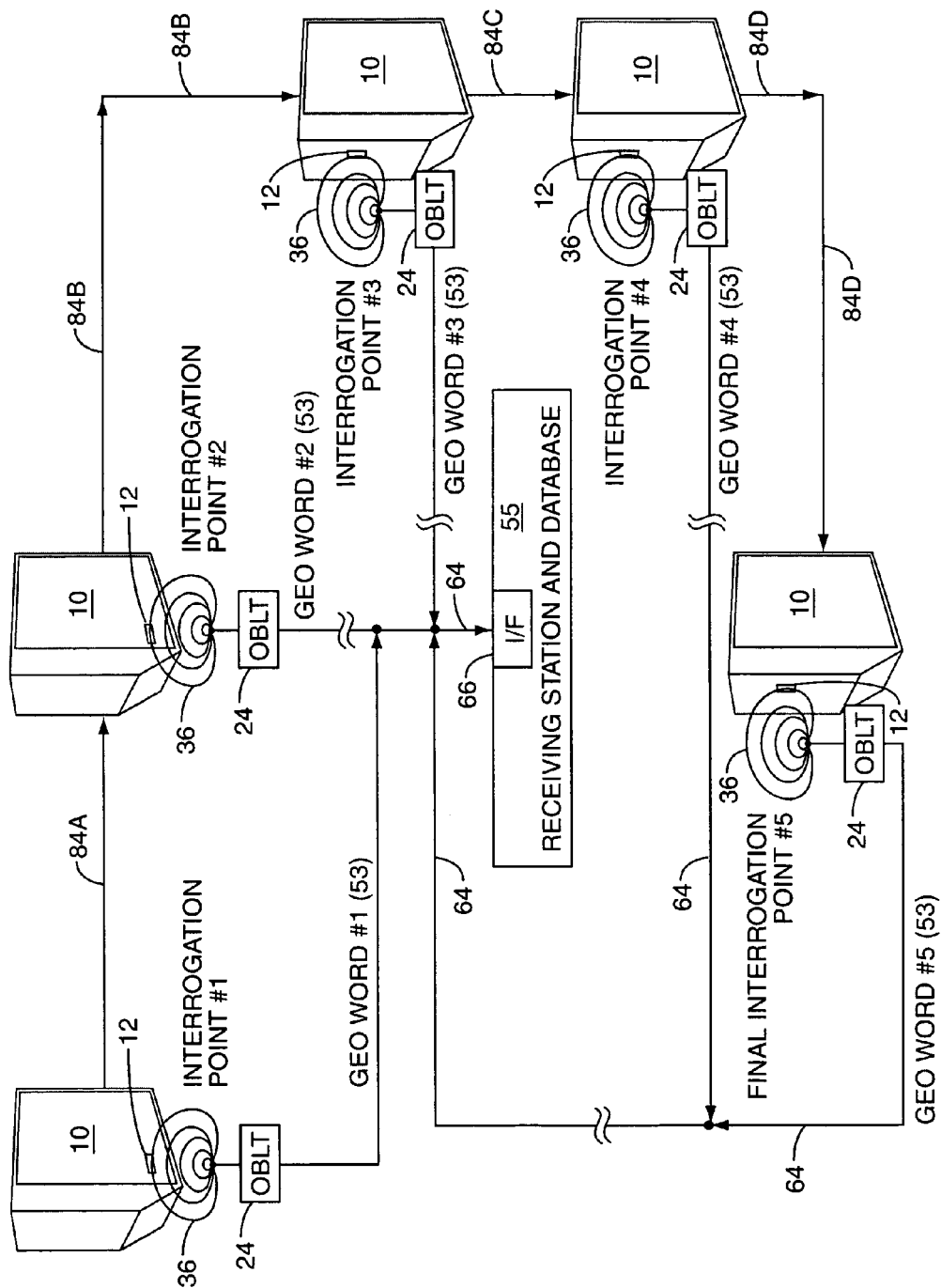
FIG. 3 is an example of multiple interrogation points using multiple OBLTs located along the destination points for a shipping container.

FIG. 3 illustrates an example of interrogation of a shipping container 10 at multiple interrogation points along an exemplary shipping route 84. As illustrated, the shipping container 10 may pass by a first interrogation point where a first OBLT 24 is located. The OBLT 24 and its RFID reader 22 interrogates the identification indicia 21 and other information, if present, from the passive identification device 12 and communicates this information in the form of the geo-word 53 to the receiving station 55. Thereafter, the shipping container 10 is shipped along a first shipping path 84A to a second interrogation point where the shipping container 10 and its passive identification devices 12 are once again interrogated by the OBLT 24 present at the second interrogation point and the geo-word 53 communicated to the receiving station 55. The process continues along shipping paths 84B, 84C, 84D until the shipping container 10 reaches its final destination point.

Operational/Tracking Processes

Now that the components of the tracking system according to the present invention have been described, the operational and tracking processes of the present invention are now described with respect to the flowcharts illustrated in FIGS. 4-8. Note that these operations are performed by the receiving station 55 and its central control system 68 in response to receipt of geo-words 53 from the OBLTs 24 regarding interrogated shipping containers 10 as well as other processes that are initiated by the central control system 68 without receipt of a geo-word 53 to track and trace shipping containers 10.

Figure 4:
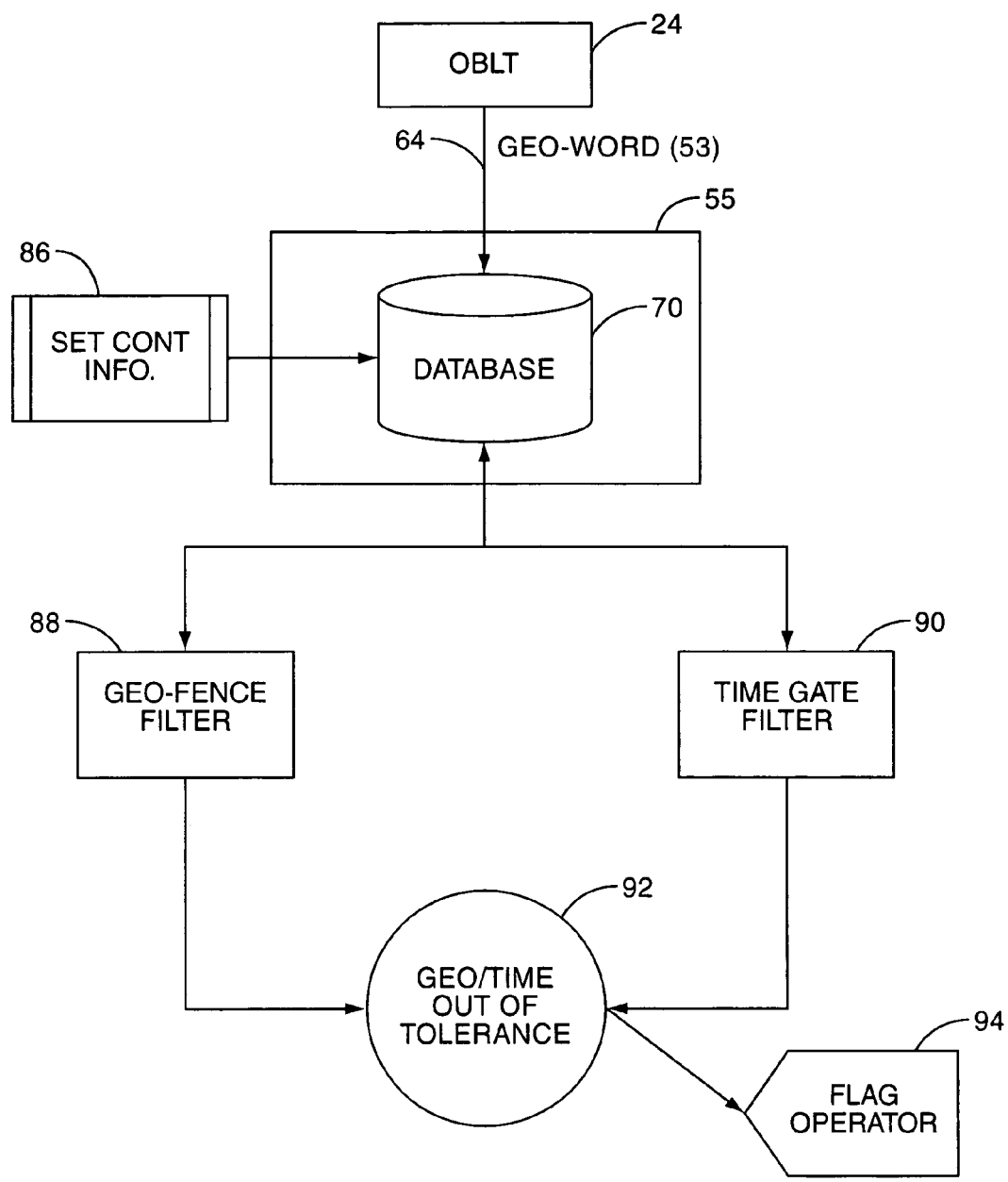
FIG. 4 is a flowchart illustrating the overall operation of the shipping container tracking system of the present invention.

FIG. 4 illustrates the overall tracking process for shipping containers 10 performed by the central control system 68. However, note that this process may also be performed by any control system that is communicatively coupled to at least one OBLT 24. As illustrated in FIG. 4, the OBLT 24 communicates the geo-word 53 formulated from an interrogated shipping container 10 to the receiving station 55 where the geo-word 53 is stored in the database 70. The database 70 is used by the central control system 68 to perform the tracking functions of the present invention.

The first function is the "set container information" process 86. This process allows an operator or other user to input the shipping manifest and other related information about a shipping container 10 according to its unique identification indicia 21 in the database 70 so that the central control system 68 can match the received geo-word 53 information about a shipping container 10 to the expected data about the shipping container 10 stored by the shipping company operator or other personnel to determine if the shipping container 10 is lost, misplaced, and/or on or off-schedule. The set container information process 86 is illustrated and discussed in more detail below with respect to the flowchart of FIG. 5.

A second function performed by the central control system 68 is the "geo-fence filter" 88. The geo-fence filter 88 analyzes the received geo-word 53 about a shipping container 10, and specifically its geographic location information, and compares the location information to the expected shipping destinations or points stored in the database 70 for the particular shipping container 10 at issue. The expected shipping or destination points about the shipping container 10 at issue were previously stored in database 70 using the set container information process 86. If the geographic location of the shipping container 10 at issue indicates that the shipping container 10 is off course from the expected shipping route, the geo-fence filter 88 triggers an off-course process 92 that will in turn flag a field in the database 70 that the shipping container 10 is off-course and/or flag an operator at either the shipping company or shipping container 10 recipient, or both, to indicate an off-course condition 94. The geo-fence filter 88 is performed when communications in the form of the geo-word 53 are established with a shipping container 10 at issue, but the shipping container 10 is not at the expected location or shipping route. The geo-fence filter 88 is illustrated and discussed in more detail below with respect to the flowchart of FIG. 6.

A third function performed by the central control system 68 is a "time-gate filter" 90. The time-gate filter 90 automatically determines, without having to receive a geo-word 53, if its shipping containers 10 stored in the database 70 are lost. The time-gate filter 90 determines the last time a geo-word 53 was received for a particular shipping container 10 by inquiring into the database 70 and comparing the time stamp of the last geo-word 53 received for a particular shipping container 10 versus the expected time for receipt of the next geo-word 53 when the shipping container 10 reaches the next expected shipping point and thus an OBLT 24. If a particular shipping container 10 has not communicated via interrogation by an OBLT 24 to the database 70 within an expected time range, the shipping container 10 is marked in database 70 as lost. Thereafter, tracking operations can automatically be initiated without a human operator having to manually recognize the lost shipping container 10. The time gate filter 90 triggers the off-course process 92 that will in turn flag a field in the database 70 that the shipping container 10 is lost or misplaced and an operator at either the shipping company or shipping container 10 recipient, or both, to indicate the off-course condition 94. The time-gate filter 90 is illustrated and discussed in more detail below with respect to the flowchart of FIG. 6.

It is important to note that since the present invention employs the passive identification device 12 that is interrogated by an OBLT 24, this increases the likelihood that the time-gate filter 90 will accurately determine a lost container 10. This is because active device enabled shipping containers 10 may not be able to transmit their location information even if the shipping container 10 is not lost and is in its intended or correct shipping point or destination. In contrast, by placing the GPS receiver and the active transmitter in the OBLT 24 as opposed to on the shipping container 10 as part of the identification system, it can be ensured that the failure of the central control system 68 to receive communications from a particular shipping container 10 is the result of a truly lost or misplaced shipping container 10 as opposed to the inability of the shipping container 10 to communicate at a particular time. The OBLTs 24 are placed in locations where their communications are not blocked as a normal course, whereas shipping containers 10 are constantly placed in locations where active remote communications are not possible due to either the transmitter being shielded or the GPS receiver being unable to receive GPS satellite signals.

"Set Container Information" Process (86)

Figure 5:
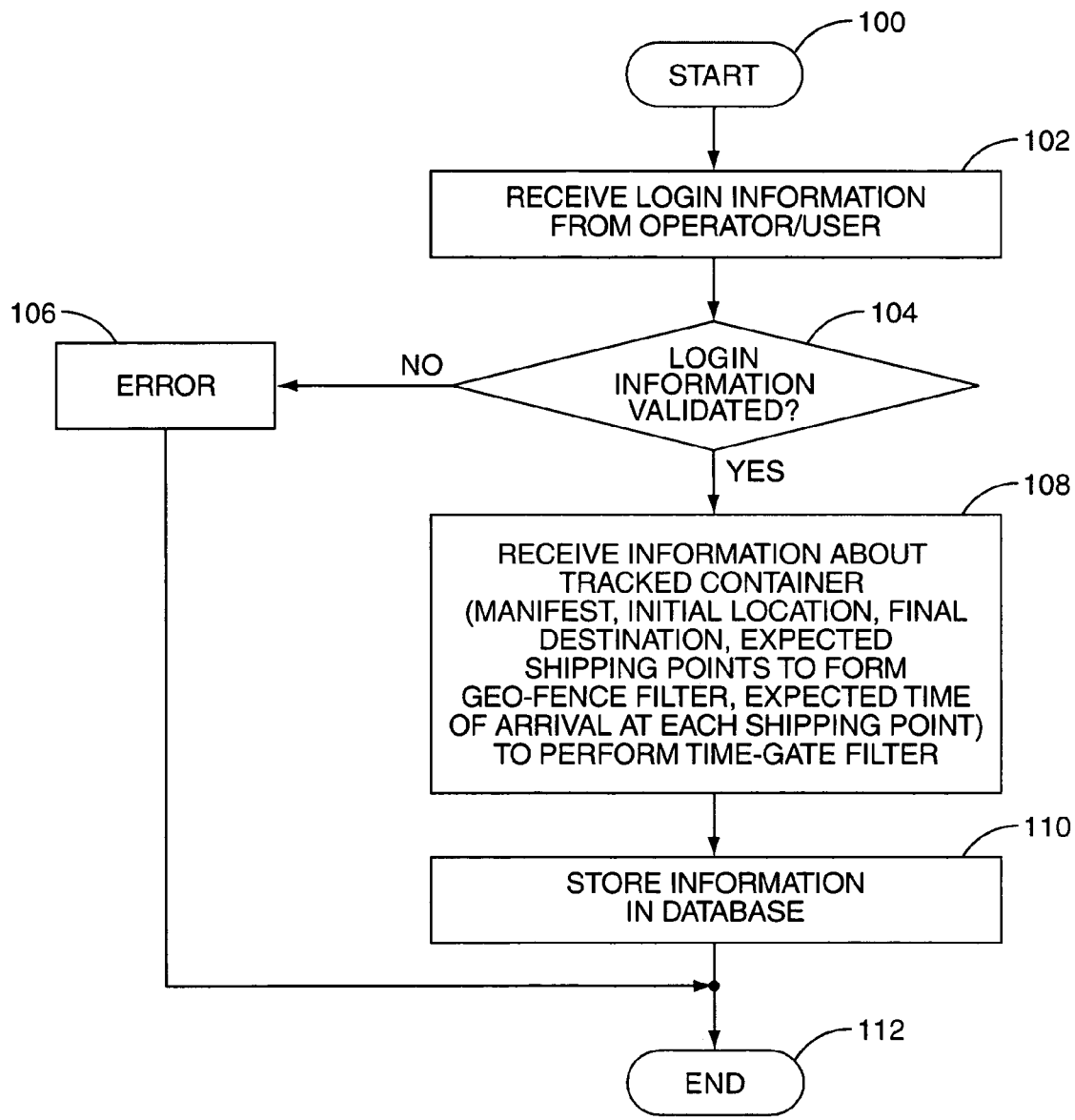
FIG. 5 is a flowchart illustrating the set container information process to inform the receiving station of the shipping container's manifest.

FIG. 5 illustrates a flow chart process to describe the "set container information" process 86. The process starts (step 100), and the central control system 68 receives login information from an operator or user (step 102). It is typical that the operator or user desiring to access the database 70 in the receiving station 55 via access to the central control system 68 first have an established account that is authorized. This may require an application and new account process, which is not described in this application. Next, the central control system 68 validates the operator or user's login information (decision 104). If the login information cannot be validated, an error message is communicated to the operator or user's terminal 72, 80 (step 106), and the process ends (step 112). If however, the operator or user's login information is validated in decision 104, the operator or user will be allowed to provide information about a shipping container 10 (step 108). This information is received by the central control system 68, and the database 70 is updated accordingly. This information about a shipping container 10 may include manifest information, the initial location of shipment of the shipping container 10, the final destination of the shipping container 10, the expected shipping point of the shipping container 10 to use informing the geo-fence filter 88, and the expected time of arrival at each shipping point to perform the time gate filter 90. Thereafter, the information is stored in the database 70 (step 110), and the process ends (step 112). At this point, information about a shipping container 10 necessary to perform the geo-fence filter 88 and the time-gate filter 90 is present in the database 70.

"Geo-Fence Filter" Process (88)

Figure 6:
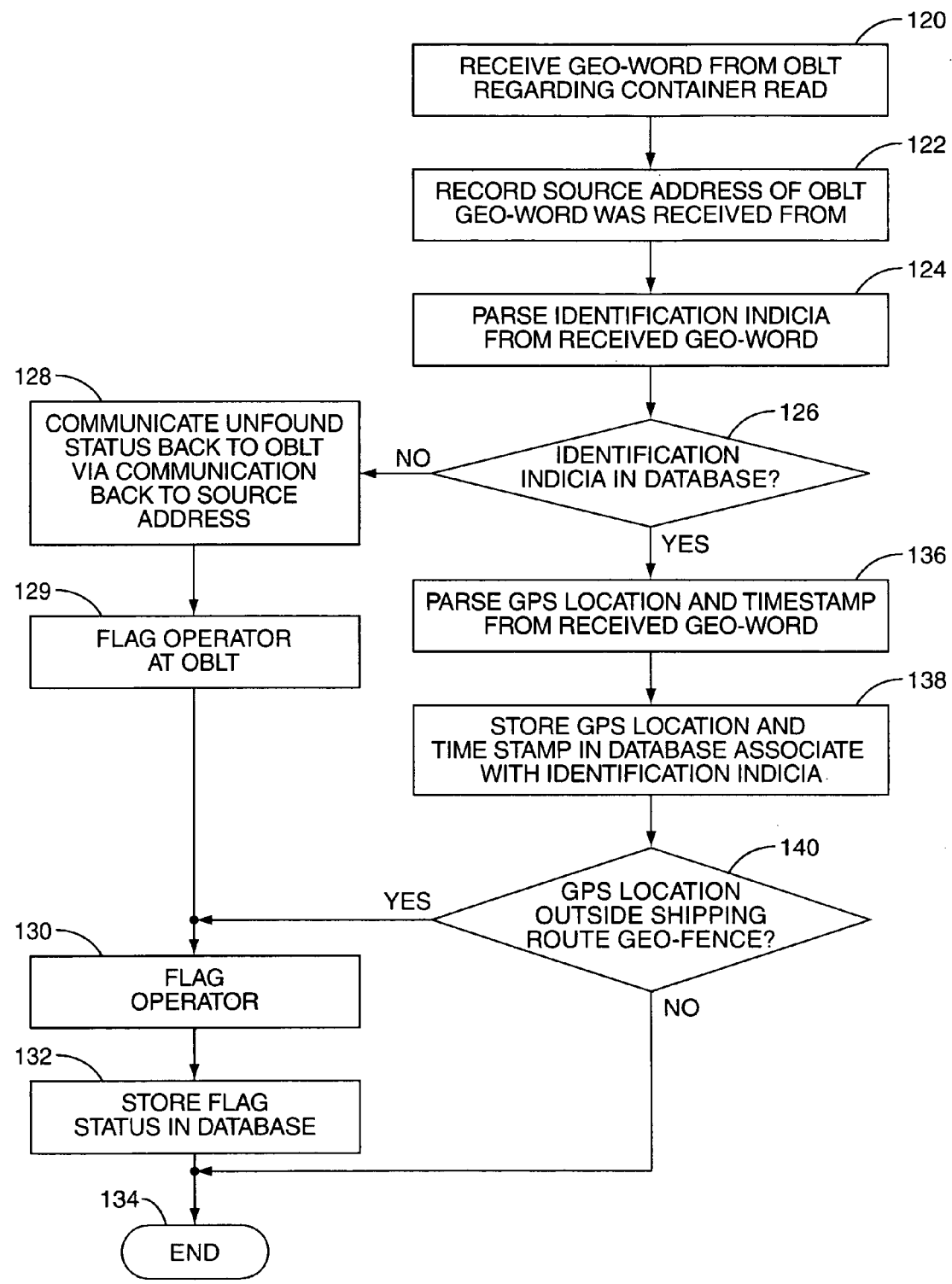
FIG. 6 is a flowchart illustrating the geo-fence filter process performed by the receiving station.

As described above, the central control system 68 performs a geo-fence filter regarding the shipping containers 10 when a geo-word 53 is received from the OBLT 24. The process is illustrated in the flow chart in FIG. 6. As illustrated in FIG. 6, the central control system 68 receives a geo-word 53 from the OBLT 24 regarding a shipping container 10 interrogated (step 120). An optional step may include the central control system 68 recording the source address of the OBLT 24 from which the geo-word 53 was received in the event that returning communications from the central control system 68 to the OBLT 24 are required or necessary (step 122). Next, the identification indicia 21 is parsed from the received geo-word 53 (step 124). This allows the central control system 68 to search the database 70 to determine if information regarding the shipping container 10 is contained and stored in the database 70 using the set container information process 86 described in FIG. 5. This is necessary since the central control system 68 cannot determine if the shipping container 10 is in the expected or desired location unless shipping information about the expected location and destination points of the shipping container 10 were previously stored by an operator or user using the set container information process 86.

If the identification indicia 21 is not stored in the database 70 (decision 126), this means that the identification indicia 21 of the shipping container 10 is not stored or recognized as being stored in the database 70. In this manner, the central control system 68 may communicate the unfound status of the shipping container 10 back to the OBLT 24 using the source address of the OBLT 24 from step 122 to indicate this status. In this manner, a flag or alarm or visual indicator on the OBLT 24 may be flagged so that a human operator can receive an indication that the shipping container 10 was considered unfound by the central control system 68 (step 129). Further, a operator or user may also receive an automatic message or flag from the central control station 68, such as terminal 72, 80 to indicate the unfound shipping container 10 (step 132). The operator or user can in turn then either take appropriate actions to make the database 70 aware of the shipping container 10 via the set container information process 86 or take other action. The unfound shipping container 10 status is also stored as a flag in database 70 associated with the shipping container's 10 identification indicia 21 (step 132), and the process ends (step 134).

If the identification indicia 21 of the shipping container 10 was found in the database 70 in decision 126, the GPS location and time stamp are parsed from the received geo-word 53 regarding the shipping container 10 (step 136). The GPS location and time stamp are then stored in the database 70 associated with the identification indicia 21 of the shipping container 10 (step 138). The central control system 68 then uses the stored GPS location and time stamp to determine if the shipping container 10 is outside of the geo-fence established by the expected locations and times stored as part of the set container information process 86 regarding the shipping container 10 of issue. If the shipping container 10 is outside the expected geo-fence (decision 140), the central control system 68 flags the operator (step 130) and stores a flag indicating the off-course condition 94 for the shipping container 10 at issue (step 132), and the process ends (step 134). The process of flagging the operator (step 130) may include automatically sending an email or other notification to a shipping company or intended recipient indicating the off-course condition 94 so that the condition can be recognized immediately. This contact information may be stored in the database 70 associated with a particular shipping container 10 via its identification indicia 21 stored as part of the set container information process 86. If however, the GPS location received from the geo-word 53 about a particular shipping container 10 is not outside the shipping route geo-fence or expected location in decision 140, then no error is present, the process simply ends (step 134) and further geo-fence filtering and processing about the particular shipping container 10 at issue is not further performed until the next geo-word 53 regarding the shipping container 10 is received by the central control system 68.

"Time-Gate Filter" (90)

Figure 7:
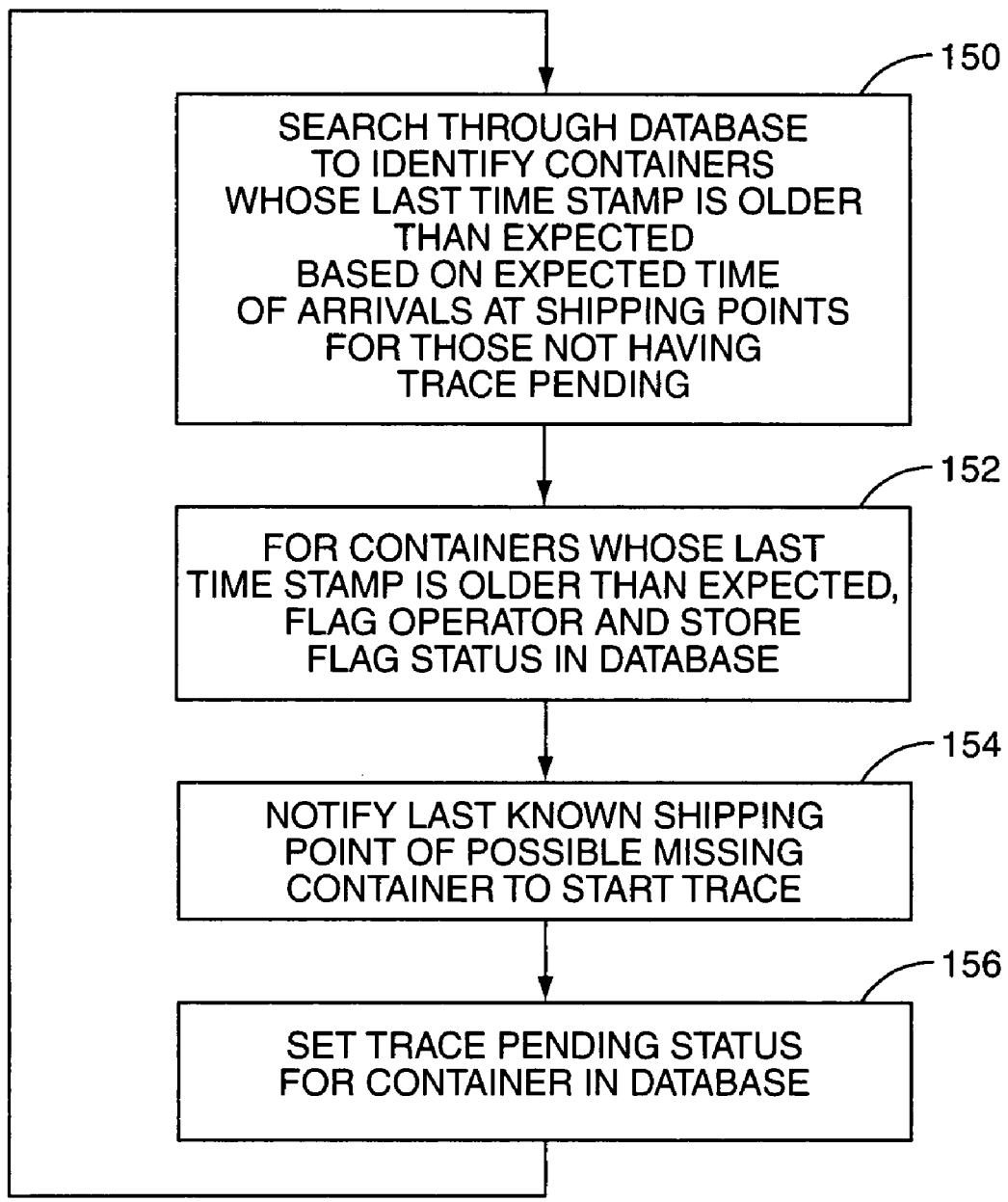
FIG. 7 is a flowchart illustrating the time gate filter process performed by the receiving station.
Figure 8:
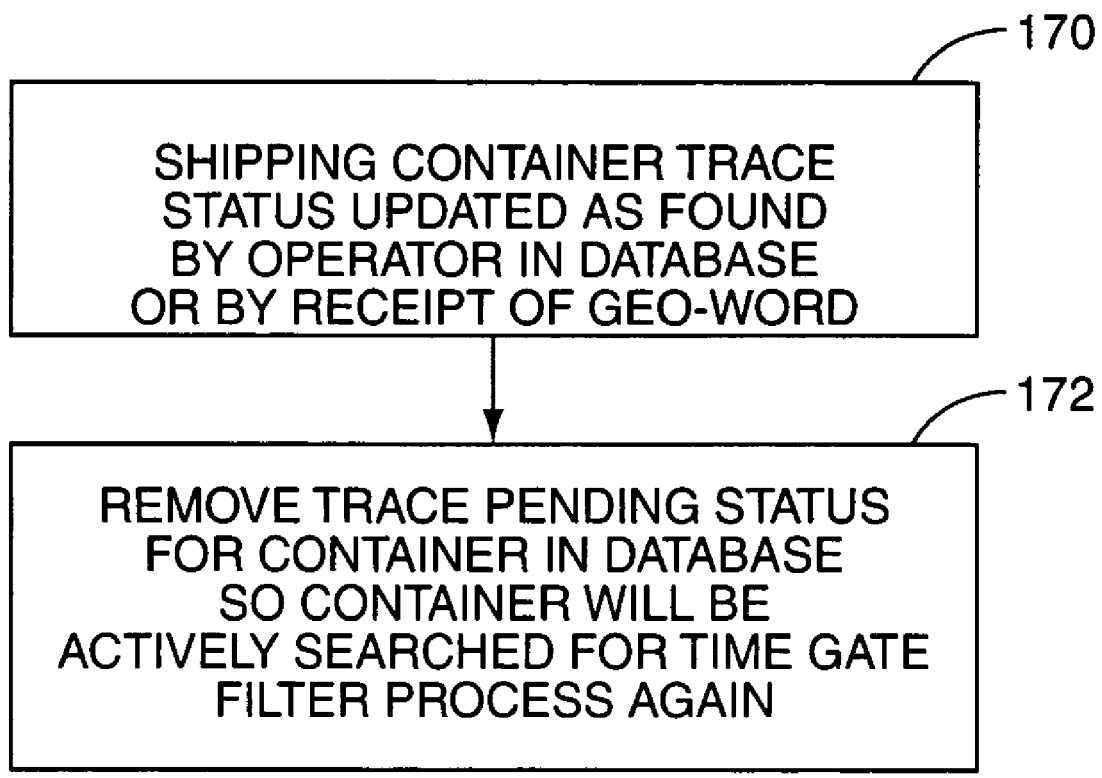
FIG. 8 is a flowchart illustrating the found container process performed by the receiving station.

The central control system 68 also performs a time-gate filter process 90 as illustrated in the flow chart in FIG. 7. The time-gate filter process 90 is used to automatically determine if a shipping container 10 is lost or misplaced. This status is determined when a geo-word 53 has not been received for a particular shipping container 10 by an expected time according to the manifest and shipping information set about a particular shipping container 10 via the set container information process 86. Periodically, and as often as is programmed and desired, the central control system 68 searches through the database 70 to identify shipping containers 10 whose last time stamp is older than an expected time of arrival at various shipping points for shipping containers 10 that are not already in a pending trace process (step 150). For shipping containers 10 whose last time stamp is older than expected, an operator such as a shipping company or intended recipient is flagged to indicate the lost or misplaced shipping container 10 and this flag status is also stored in the database 70 (step 152). The shipping container 10 is known to be misplaced or lost, because a geo-word 53 has not been received and stored in the database 70 when expected within a desired tolerance range. In this manner, the central control system 68 automatically initiates and determines a lost or misplaced condition of the shipping container 10 information without first having to receive a communication from the shipping container 10 or the OBLT 24. The last known shipping point of the shipping container 10 is provided to start a trace of the shipping container 10 (step 154). This is possible because the database 70 contains a stored geo-word 53 received regarding the shipping container 10 from its last known received location. Thus, the shipping container 10 was either misplaced or lost after being located at the GPS location of the last received geo-word 53. Lastly, the trace status is stored as pending in the database 70 for the shipping container 10 (step 156), so that the central control system 68 can know that a shipping container 10 already has a pending trace on the next iteration of searching through the database 70 for shipping containers 10 where a geo-word 53 has not been received within an expected time.

Once a geo-word 53 is received from a particular shipping container 10 on which a trace had been previously established, or if an operator manually enters a found status for a shipping container 10 via central control system 68 into database 70, such as if the shipping container 10 is manually found without communication being established via an OBLT 24 (step 170 of FIG. 8), the traced pending status for the shipping container 10 at issue will be updated as found in database 70. This is so that the shipping container 10 can be actively searched in the time-gate filter process 90 again automatically (step 172) since the time-gate filter process 90 only checks the expected time stamp for shipping containers 10 who do not already have a trace pending, as shown in step 150 in FIG. 7. If communication is re-established and a shipping container 10 is found by receipt of a geo-word 53, the central control system 68 will again perform the geo-fence filter 88, as illustrated and described in FIG. 6, due to the receipt of the geo-word 53 as normal. Thus, a found shipping container 10 is again tracked by both the geo-fence filter process 88 and the time-gate filter process 90 automatically upon its status being updated as found, either by receipt of a geo-word 53 or by an operator manually indicating that shipping container 10 has been found.

Those skilled in the art will recognize improvements and modifications to the preferred embodiments of the present invention. All such improvements and modifications are considered within the scope of the concepts disclosed herein and the claims that follow.

What is claimed is:

1. A receiving station for tracking a shipping container, comprising:
    a control system coupled to a database;
    a communication interface coupled to the control system, wherein the control system is adapted to receive shipping container tracking messages over a communication network via the communication interface;
    wherein the control system is adapted to:
        receive an itinerary for a shipping container having an identification indicia;
        store the itinerary of shipping containers in the database associated with the shipping container's identification indicia;
        receive shipping container tracking messages comprising identification indicia of shipping containers over the communication network;
        store the shipping container tracking messages in the database according to their respective identification indicia;
        search through the database to determine when a shipping container tracking message was last received over the communication network for each of the shipping containers according to their identification indicia; and
        determine if a shipping container is lost based on whether the shipping container tracking message for a shipping container was received according to the stored itinerary for the shipping container.

2. The receiving station of claim 1, wherein the communication network is network comprised from the group consisting of a satellite communication network, a PSTN network, a data packet switched network, a cellular network, and a WIFI network.

3. The receiving station of claim 1, wherein the shipping container tracking message further comprises a time stamp when the identification indicia was received.

4. The receiving station of claim 3, wherein the control system is adapted to determine if a shipping container is lost based on whether the shipping container tracking message for a shipping container was received according to the stored itinerary for the shipping container based on whether the time stamp in the stored shipping container tracking message for the shipping container is within an acceptable limit of the itinerary for the shipping container.

5. The receiving station of claim 1, wherein the control system is further adapted to generate a flag if the control system determines that a shipping container is lost.

6. The receiving station of claim 5, wherein the flag is either an operator flag or a flag stored in the database associated with the lost shipping container, or both.

7. The receiving station of claim 1, wherein the control system initiates a trace of a lost shipping container if the shipping container is lost.

8. The receiving station of claim 7, wherein the control system is further adapted to store a trace status of the lost shipping container in the database associated with the identification indicia of the lost shipping container.

9. The receiving station of claim 8, wherein the control system is further adapted to remove the trace status of the lost shipping container in the database in response to receipt of a subsequent shipping container tracking message for the lost shipping container or in response to receipt of an operator instruction.

10. The receiving station of claim 1, wherein the shipping container tracking message comprises a GPS location of a shipping container.

11. The receiving station of claim 10, wherein the control system stores the GPS location in the database associated with the identification indicia of the shipping container.

12. The receiving station of claim 10, wherein the control system is further adapted to determine if a shipping container is off-schedule or misrouted by comparing the itinerary for the shipping container to the GPS location of the shipping container and determining if the GPS location is within an expected location.

13. The receiving station of claim 12, wherein the control system is further adapted to determine if the GPS location of the shipping container is within an expected location based on a time stamp contained in the shipping container tracking message.

14. The receiving station of claim 12, wherein the control system is further adapted to generate a flag if the control system determines that a shipping container is off-schedule or misrouted.

15. The receiving station of claim 14, wherein the flag is either an operator flag or a flag stored in the database associated with the off-schedule or misrouted shipping container, or both.

16. The receiving station of claim 1, wherein the control system communicates the shipping container tracking message to an operator or another system when received.

17. The receiving station of claim 1, wherein the control system is adapted to determine if the identification indicia contained in the received shipping container tracking message is present in the database.

18. The receiving station of claim 17, wherein the control system generates an error if the identification indicia contained in the received shipping container tracking message is not present in the database.

19. The receiving station of claim 1, wherein the control system receives the shipping container tracking message from an on-board location tracker over the communication network.

20. The receiving station of claim 19, wherein the on-board location tracker comprises an interrogation reader that is adapted to interrogate an identification device on a shipping container and receive the shipping container's identification indicia.

21. The receiving station of claim 20, wherein the on-board location tracker further comprises a GPS receiver that is adapted to determine the GPS location of the on-board location tracker, and wherein the on-board location tracker generates the shipping container tracking message comprising a geo-word comprised of the identification indicia of an interrogated shipping container and the GPS location of the on-board location tracker to provide the GPS location of the interrogated shipping container.

22. The receiving station of claim 21, wherein the on-board location tracker further includes a return communication address of the on-board location tracker in the shipping container tracking message so that the receiving station can address the on-board location tracker in a return communication.

23. The receiving station of claim 22, wherein the control system is further adapted to determine if a shipping container is off-schedule or misrouted by comparing the itinerary for the shipping container to the GPS location of the shipping container and determining if the GPS location is within an expected location and communicate a return communication back to the on-board location tracker if the shipping container is off-schedule or misrouted.

24. A method of tracking a shipping container, comprising the steps of:
receiving an itinerary for a shipping container having an identification indicia;
storing the itinerary of shipping containers in a database associated with the shipping container's identification indicia;
receiving shipping container tracking messages comprising identification indicia of shipping containers over a communication network;
storing the shipping container tracking messages in the database according to their respective identification indicia;
searching through the database to determine when a shipping container tracking message was last received over the communication network for each of the shipping containers according to their identification indicia; and
determining if a shipping container is lost based on whether the shipping container tracking message for a shipping container was received according to the stored itinerary for the shipping container.

25. The method of claim 24, wherein the step of receiving shipping container tracking messages comprises receiving shipping container tracking messages over a communication network comprised of a network from the group consisting of a satellite communication network, a PSTN network, a data packet switched network, a cellular network, and a WIFI network.

26. The method of claim 24, further comprising receiving a time stamp when the identification indicia was received as part of the shipping container tracking message.

27. The method of claim 26, further comprising determining if a shipping container is lost based on whether the shipping container tracking message for a shipping container was received according to the stored itinerary for the shipping container based on whether the time stamp in the stored shipping container tracking message for the shipping container is within an acceptable limit of the itinerary for the shipping container.

28. The method of claim 24, further comprising generating a flag if the control system determines that a shipping container is lost.

29. The method of claim 28, wherein the flag is either an operator flag or a flag stored in the database associated with the lost shipping container, or both.

30. The method of claim 24, further comprising initiating a trace of a lost shipping container if the shipping container is lost.

31. The method of claim 30, further comprising storing a trace status of the lost shipping container in the database associated with the identification indicia of the lost shipping container.

32. The method of claim 31, further comprising removing the trace status of the lost shipping container in the database in response to receipt of a subsequent shipping container tracking message for the lost shipping container or in response to receipt of an operator instruction.

33. The method of claim 24, wherein the shipping container tracking message comprises a GPS location of a shipping container.

34. The method of claim 33, further comprising storing the GPS location in the database associated with an identification indicia of the shipping container.

35. The method of claim 33, further comprising determining if a shipping container is off-schedule or misrouted by comparing the itinerary for the shipping container to the GPS location of the shipping container and determining if the GPS location is within an expected location.

36. The method of claim 35, further comprising determining if the GPS location of the shipping container is within an expected location based on a time stamp contained in the shipping container tracking message.

37. The method of claim 35, further comprising generating a flag if the control system determines that a shipping container is off-schedule or misrouted.

38. The method of claim 37, wherein the flag is either an operator flag or a flag stored in the database associated with the off-schedule or misrouted shipping container, or both.

39. The method of claim 24, further comprising communicating the shipping container tracking message to an operator or another system when received.

40. The method of claim 24, further comprising determining if the identification indicia contained in the received shipping container tracking message is present in the database.

41. The method of claim 40, further comprising generating an error if the identification indicia contained in the received shipping container tracking message is not present in the database.

42. The method of claim 24, further comprising receiving the shipping container tracking message from an on-board location tracker over the communication network.

43. The method of claim 42, further comprising interrogating an identification device on a shipping container using an interrogation reader in the on-board location tracker and receiving the shipping container's identification indicia.

44. The method of claim 43, further comprising determining the GPS location of the on-board location tracker using a GPS receiver in the on-board location tracker, and generating a shipping container tracking message comprising a geoword comprised of the identification indicia of an interrogated shipping container and the GPS location of the on-board location tracker to provide the GPS location of the interrogated shipping container.

45. The method of claim 44, further comprising the on-board location tracker including a return communication address of the on-board location tracker in the shipping container tracking message so that the receiving station can address the on-board location tracker in a return communication.

46. The method of claim 45, further comprising determining if a shipping container is off-schedule or misrouted by comparing the itinerary for the shipping container to the GPS location of the shipping container and determining if the GPS location is within an expected location and communicate a response message back to the on-board location tracker if the shipping container is off-schedule or misrouted.

* * * * *